United States Patent
Gieriet

(10) Patent No.: US 12,511,101 B2
(45) Date of Patent: Dec. 30, 2025

(54) DATA PROCESSING DEVICE HAVING A LOGIC CIRCUIT FOR CALCULATING A MODIFIED CROSS SUM

(71) Applicant: eXternSoft GmbH, Zürich (CH)

(72) Inventor: Andreas Gieriet, Zürich (CH)

(73) Assignee: eXternSoft GmbH, Zürich (CH)

( * ) Notice: Subject to any disclaimer, the term of this patent is extended or adjusted under 35 U.S.C. 154(b) by 932 days.

(21) Appl. No.: 17/719,419

(22) Filed: Apr. 13, 2022

(65) Prior Publication Data

US 2022/0236948 A1      Jul. 28, 2022

(51) Int. Cl.
  *G06F 7/535*      (2006.01)

(52) U.S. Cl.
  CPC ..................... *G06F 7/535* (2013.01)

(58) Field of Classification Search
  CPC ........................................................ G06F 7/535
  See application file for complete search history.

(56) References Cited

U.S. PATENT DOCUMENTS

| | | |
|---|---|---|
| 3,223,831 A | 12/1965 | Holleran |
| 3,293,418 A | 12/1966 | Thornton |
| 3,344,261 A | 9/1967 | Hornung |
| 3,527,930 A | 9/1970 | Cocke et al. |
| 4,334,285 A | 6/1982 | Kawakita et al. |

OTHER PUBLICATIONS

Merrill, R. D. (1964). Improving digital computer performance using residue number theory. IEEE Transactions on Electronic Computers, (2), 93-101.
Stillwell, J., & Stillwell, J. (2003). Elements of number theory (vol. 12). New York: Springer (Chapter Congruence Arithmetic pp. 43-65).

*Primary Examiner* — Carlo Waje

(57) ABSTRACT

A logic circuit configured to calculate a quotient Q based on a modified cross-sum of an input word CP, a digital circuit having a first input for the input word CP that is a bit-wise inverted value of a number N of M-bit digits having a radix $2^M$ from a least significant digit to a most significant digit, the circuit configured to calculate a quotient Q, M and N being positive integer numbers larger than one, wherein the digital circuit has a second input RIN that is configured to be set to zero, or to receive a remainder value from another logic circuit, and wherein the digital circuit provides for an output word Q having N digits, each digit of radix $2^M$, the output word Q being a raw quotient of the bit-wise inverted value of the input word CP.

20 Claims, 13 Drawing Sheets

| Sequencer (Initial Current State = R-State) ||||||
| Current State | Start | Next State | Select $R_{in}$ | Load $R_{out}$ | Load Results |
| --- | --- | --- | --- | --- | --- |
| R-State | Inactive | R-State | 0 | Inactive | Inactive |
| R-State | Active | Q-State | 0 | Active | Inactive |
| Q-State | - | R-State | $R_{out}$ | Inactive | Active |

DATA PROCESSING DEVICE HAVING A LOGIC CIRCUIT FOR CALCULATING A MODIFIED CROSS SUM

FIELD OF THE INVENTION

The present invention relates generally to digital signal processing, more specifically a circuit for performing specific types of arithmetic operations such as divisions, more specifically a logic circuit for performing a divisions by a Mersenne number.

BACKGROUND

In the field of digital circuits for performing arithmetic operations, for example circuits that are configured to perform divisions by a Mersenne number, different methods and devices having logic circuits have been presented. For example, U.S. Pat. No. 4,334,285, this reference herewith incorporated by reference in its entirety, describes a divider for dividing a natural number by a Mersenne number. However, the circuit proposed in this patent is complex and not scalable to different number of digits to perform the operations. Other division circuits of the state of the art, for example the ones described in U.S. Pat. Nos. 3,527,930, 3,344,261, 3,223,831, and 3,293,418, these references herewith incorporated by reference in their entirety, also fail to provide a remedy for the above discussed deficiencies.

With respect to long division algorithms, being the most generic integer division methods employed by division units of a data processor, these algorithms involve a considerable calculating effort, whether in software or in hardware. Other methods of integer division involve multiplying by a pre-calculated fix-point constant 1/divisor. Such multiplication has less calculating effort than generic division, but still is considerable high effort, and may lead to potential rounding issues.

Therefore, in light of the above-described deficiencies of the background art, there is strong need for improved digital or logic circuits for performing arithmetic operations, for example a logic circuit that is configured to perform divisions that is scalable to a given number of bits and has a reduced complexity.

SUMMARY

According to one aspect of the present invention, a logic circuit configured to calculate a quotient based on a modified cross-sum of an input word CP is provided. The input word CP is a result of a bit-wise inverted value of a number N of M-bit digits having a radix $2^M$ from a least significant digit to a most significant digit, M and N being positive integer numbers larger than one (1). The logic circuit preferably includes a number N of M-bit adders, each M-bit adder having an M-bit wide output, two M-bit wide inputs, a carry-in bit, and a carry-out bit.

Moreover, preferably, a first input of the two M-bit wide inputs of each M-bit adder is operatively connected to an M-bit wide digit of the input word CP from the least significant digit to the most significant digit, an M-bit wide output of each M-bit adder, other that the M-bit output of the M-bit adder representing a most-significant digit of the input word CP, is operatively connected to a second input of the M-bit adder of a next higher valued digit of the input word CP, a carry-out bit of each M-bit adder, other than the carry-out bit of the M-bit adder representing a most-significant digit of the input word CP, is operatively connected to a carry-in bit of the M-bit adder of a next higher valued digit of the input word CP, a carry-in bit of the M-bit adder representing a least-significant digit of the input word CP is set to unity.

In addition, a second input RIN of the two M-bit wide inputs of the M-bit adder representing the least-significant digit of the input word CP is configured to be set to zero, or to receive a remainder value from another logic circuit, and the number N of M-bit wide outputs of the M-bit adders provides for an output word Q having N digits, each digit of radix $2^M$, the output word Q being a raw quotient of the bit-wise inverted value of the input word CP.

According to another aspect of the present invention, a logic circuit configured to calculate a quotient Q based on a modified cross-sum of an input word CP is provided. Preferably, the logic circuit includes a digital circuit having a first input for the input word CP that is a bit-wise inverted value of a number N of M-bit digits having a radix $2^M$ from a least significant digit to a most significant digit, the circuit configured to calculate a quotient Q, M and N being positive integer numbers larger than one (1), the digital circuit has a second input RIN that is configured to be set to zero, or to receive a remainder value from another logic circuit, and the digital circuit provides for an output word Q having N digits, each digit of radix $2^M$, the output word Q being a raw quotient of the bit-wise inverted value the input word CP.

Moreover, preferably, according to still another aspect of the present invention, a first input of the two M-bit wide inputs of each M-bit adder is operatively connected to an M-bit wide digit of the input word CP from the least significant digit to the most significant digit, an M-bit wide output of each M-bit adder, other that the M-bit output of the M-bit adder representing a most-significant digit of the input word CP, is operatively connected to a second input of the M-bit adder of a next higher valued digit of the input word CP, a carry-out bit of each M-bit adder, other than the carry-out bit of the M-bit adder representing a most-significant digit of the input word CP, is operatively connected to a carry-in bit of the M-bit adder of a next higher valued digit of the input word CP, a carry-in bit of the M-bit adder representing a least-significant digit of the input word CP is set to unity.

In addition, a second input RIN of the two M-bit wide inputs of the M-bit adder representing the least-significant digit of the input word CP is configured to be set to zero, or to receive a remainder value from another logic circuit, and the number N of M-bit wide outputs of the M-bit adders provides for an output word Q having N digits, each digit of radix $2^M$, the output word Q being a raw quotient of the bit-wise inverted value of the input word CP.

According to still another aspect of the present invention, a non-transitory computer readable medium is provided, the non-transitory computer readable medium having hardware description language (HDL) code recorded thereon is provided. The HDL code describes a logic circuit, and preferably the logic circuit is configured to calculate a quotient based on a modified cross-sum of an input word CP, the input word CP being a result of a bit-wise inverted value of a number N of M-bit digits having a radix $2^M$ from a least significant digit to a most significant digit, M and N being positive integer numbers larger than one (1), and the logic circuit preferably including a number N of M-bit adders, each M-bit adder having an M-bit wide output, two M-bit wide inputs, a carry-in bit, and a carry-out bit.

According to another aspect of the present invention, a non-transitory computer readable medium is provided, the non-transitory computer readable medium having computer code recorded thereon, the computer code configured to perform a method of performing a division when executed by a data processor device of a computer, the division using a modified cross-sum circuit or logic.

Also, according to yet another aspect of the present invention, a hardware computer device or hardware computer system is provided, having one or more logic circuits therein, the logic circuits configured to calculate a quotient based on a modified cross-sum of an input word.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE SEVERAL VIEWS OF THE DRAWINGS

The accompanying drawings, which are incorporated herein and constitute part of this specification, illustrate the presently preferred embodiments of the invention, and together with the general description given above and the detailed description given below, serve to explain features of the invention.

Figure 1A:
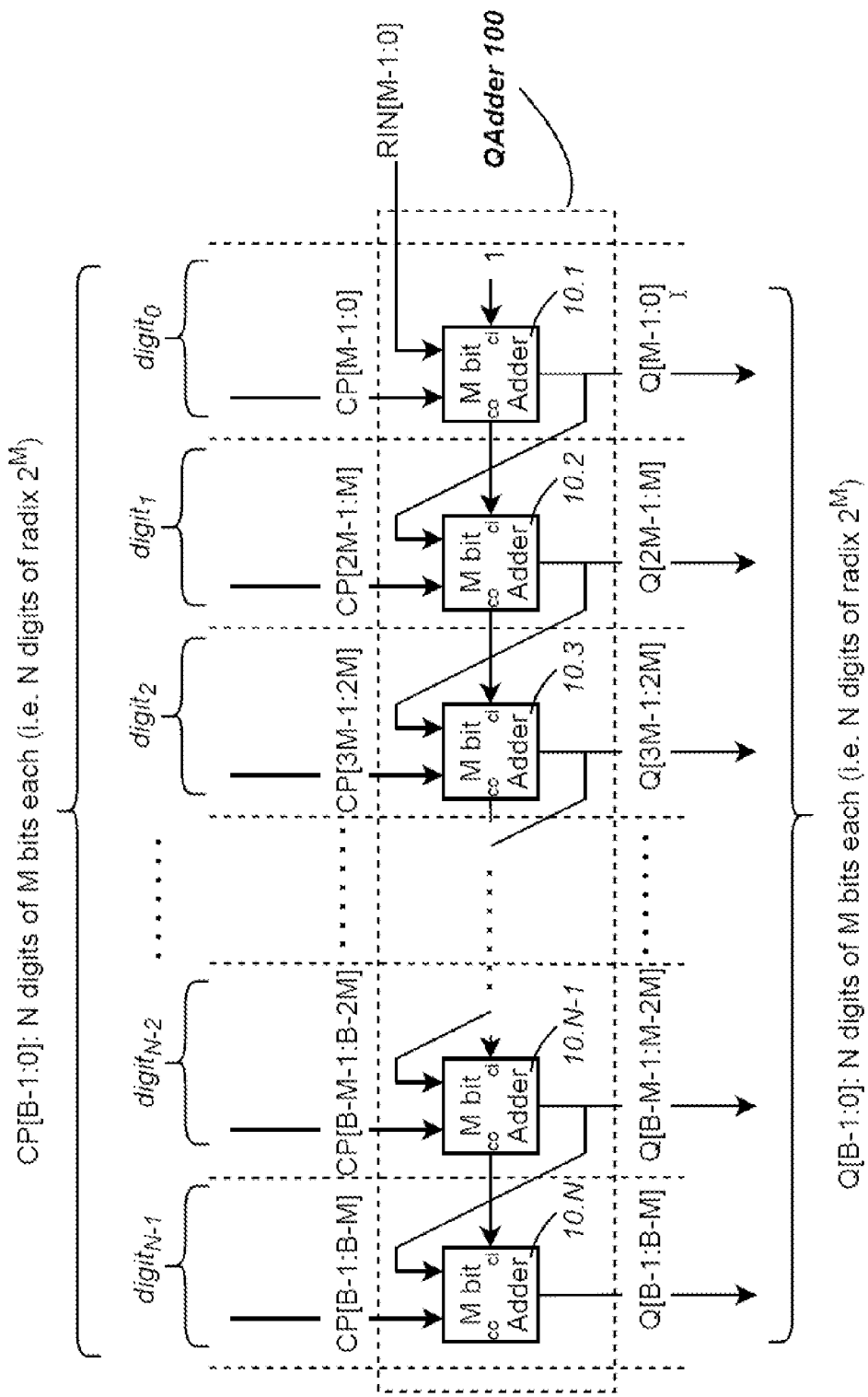
FIG. 1A shows an exemplary schematic view of a logic circuit 100, herein referred to as the QAdder circuit 100, as a modified cross-sum calculation circuit including a plurality of adders 10.1 to 10.N that are interconnected as a chain of adders, the QAdder circuit 100 serving as a base logic circuit element for different types of division calculation circuits proposed herein, according to one aspect of the present invention.

by employing a RQAdder circuit 200 for division by $(2^4-1)$ together with a sequencer circuit 40, a multiplexer circuit 15, a register $R_{out}$ 75, a sign extension circuit 60, a ones' complement circuit 50, a circuit performing a multiplication by $(2^2-1)$ by employing one addition only, a QAdder circuit 100 and an associated ones' complement circuit 50 to divide the provisionally calculated remainder by $(2^2-1)$, an input register P 90, an input register Start 95, an output register Q 70, and an output register R 80, according to still another aspect of the present invention.

Herein, identical reference numerals are used, where possible, to designate identical elements that are common to the figures. Also, the images in the drawings are simplified for illustration purposes and may not be depicted to scale.

DETAILED DESCRIPTION OF THE SEVERAL EMBODIMENTS

According to one aspect of the present invention, a logic circuit 100 is provided, as shown schematically and exemplarily in FIG. 1A, hereinafter also referred to as the QAdder circuit 100. The logic circuit 100 is configured to calculate a quotient Q based on a modified cross-sum of an input word CP, the input word CP being a result of a bit-wise inverted value of a number N of M-bit digits having a radix $2^M$ from a least significant digit to a most significant digit. The logic circuit 100 can include a number N of M-bit adders 10.1 to 10.N, each M-bit adder 10 having an M-bit wide output, two M-bit wide inputs, a carry-in bit, and a carry-out bit, M and N being positive integer numbers larger than one.

The modified cross-sum circuit of the logic circuit 100 includes a common cross-sum circuit with four modifications thereto. First, the input is assumed to be the ones' complement of the input value to calculate the cross-sum. Second, no final cross-sum term is calculated. Third, the adder chain of the common cross-sum circuit of logic circuit 100 is extended towards the least significant side with another cross-sum adder where the least significant digit is now added with a new input RIN and carry-in set to unity. In addition, finally, the sum output of each digit adder of the cross-sum adder chain is taken as a raw quotient that might coincide with the final quotient if the RIN input is the correct remainder of the division by $2^M-1$, or which might be taken as base for further calculating the proper quotient.

In the first minimal configuration, N can be set to the value two (2), which means there are two adders 10.1 and 10.2, thereby generating a cross-sum from two M-bit digits, with a chain of two adders. Theoretically, it is also possible to set the value N to one (1), and the herein described circuits are still operable. This simple variant with N=1 of a QAdder 100, 120 would only use one (1) adder circuit without in fact forming a chain of multiple adders still can be used for different applications, for example for negative P values, and also in the context of the application variants shown in FIG. 2D having an RQAdder 200, and FIG. 2F. The M-bit adders 10.1 to 10.N can be implemented as digital logic circuits, for example but not limited to CMOS logic, TTL logic, BiCOMS logic, integrated injection logic (IIL), or other types of logic circuits and logic families. It is also possible that the logic circuit 100, including the M-bit adders 10.1 to 10.N, and the other circuits described herein, are implemented to different types of programmable logic devices, for example but not limited to field-programmable gate array (FPGA), complex programmable logic device (CPLD) type circuit, application-specific integrated circuit (ASIC), programmable array logic (PAL), different types of programmable logic devices (PLD), but also fabricated as integrated circuit (IC) into a microchip in a fixed fashion. It is also possible that the logic circuit 100, and the other logic circuits described herein, is part of a central processing unit (CPU), and addition or part of an arithmetic logical unit (ALU), or a co-processor for an existing hardware processing environment.

Moreover, for the logic circuit 100, a first input of the two M-bit wide inputs of each M-bit adder is operatively connected to an M-bit wide digit of the input word CP from the least significant digit to the most significant digit, the least significant digit exemplarily shown on the right side of FIG. 1A, and an M-bit wide output of each M-bit adder, other that the M-bit output of the M-bit adder representing a most-significant digit of the input word CP, is operatively connected to a second input of the M-bit adder of a next higher valued digit of the input word CP, thereby providing for a chain of signal feedback from between each adjacent adder. Moreover, a carry-out bit of each M-bit adder, other than the carry-out bit of the M-bit adder representing a most-significant digit of the input word CP, is operatively connected to a carry-in bit of the M-bit adder of a next higher valued digit of the input word CP.

Furthermore, a carry-in bit of the M-bit adder representing a least-significant digit of the input word CP is set to unity. This can be done by simply setting the carry-in bit of the M-bit adder of the least-significant digit to the supply voltage VCC with fixed wiring, by using a register that has the unity value stored therein, or by providing the unity value from another logic circuit, for example an external logic circuit that is interconnected to the logic circuit 100. Also, a second input RIN of the two M-bit wide inputs of the M-bit adder representing the least-significant digit of the input word CP is configured to be set to zero, or to receive a remainder value from another logic circuit. In this respect, the second input RIN can be wired to GND for receiving zero values by a fixed wiring, by using a register that has the zero values stored therein, or by providing the zero values from another logic circuit, for example an external logic circuit that is interconnected to the logic circuit 100, the same way the remainder value can be received from another logic circuit. Moreover, the number N of M-bit wide outputs of the M-bit adders provide for an output word Q having N digits, each digit having a radix $2^M$, the output word Q being a raw quotient of a ones' complement or bit-wise inverted value of the input word CP. The expression "raw quotient" used herein is used to describe a quotient value that might coincide with the final quotient Q if the RIN input is the correct remainder of the division by $2^M-1$, or which might be taken as base for further calculating the proper quotient.

The above-described logic circuit 100 or QAdder circuit 100 that includes a plurality of adders 10.1 to 10.N that are interconnected as a chain and configured in specific way described above can serve as a basic logic block, box, or element, for different types of integer division circuits, as further explained below, for example the divisor circuits 300, 400, 500, 600 described below, thereby providing for a scalable and extendable architecture for a hardware element, in the form of a simple data processing device, that can be used for various data processing applications, and can be specifically configured depending on the needs of the data processing application.

Figure 1B:
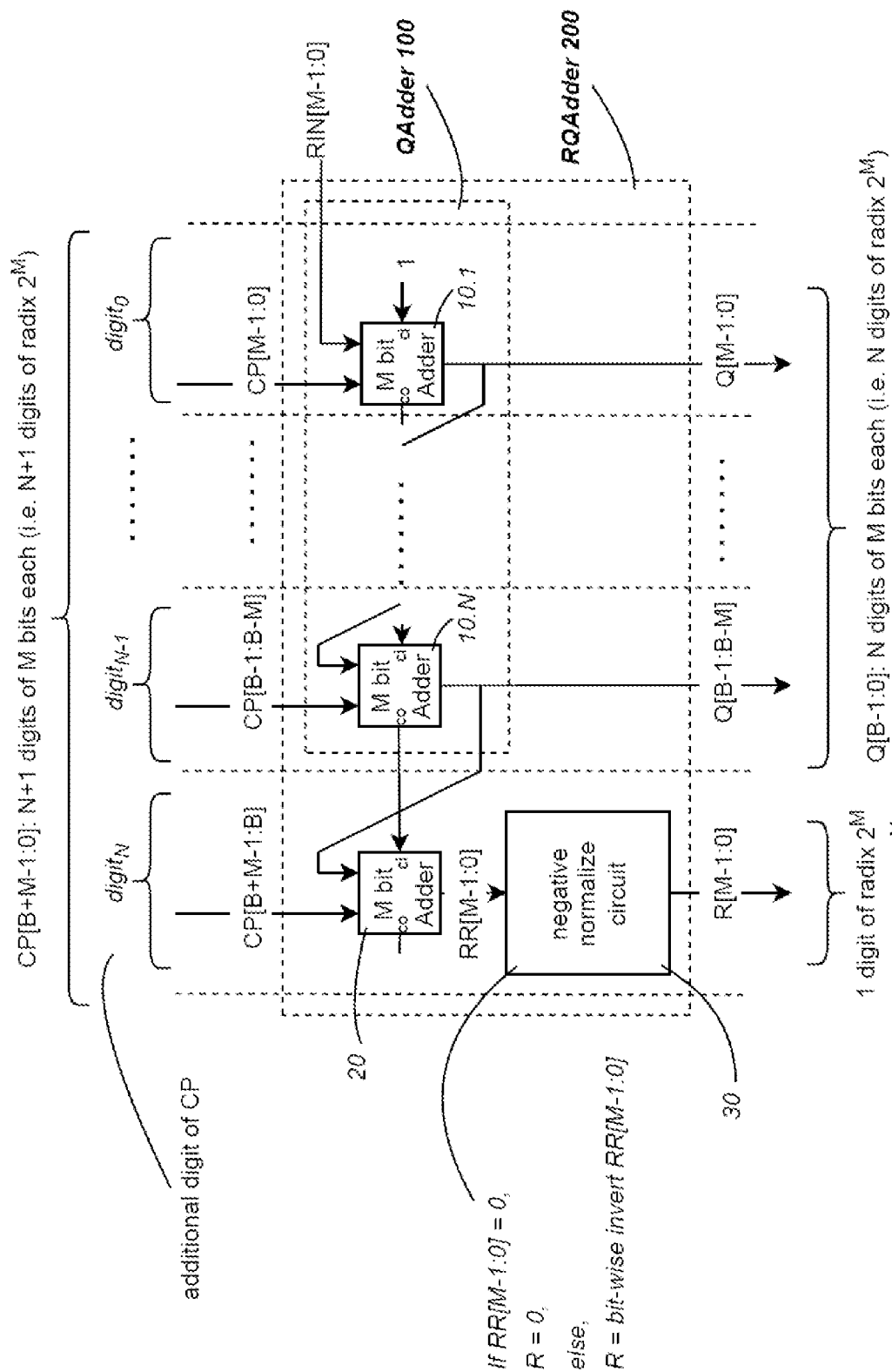
FIG. 1B shows an exemplary schematic view of a logic circuit 200, herein referred as to the RQAdder circuit 200, including a QAdder 100 circuit of FIG. 1A to calculate the quotient Q, an additional adder 20, and a negative normalize circuit 30 to calculate the remainder R, according to another aspect of the present invention.

FIG. 1B shows another aspect of the present invention, showing a logic circuit 200, or RQAdder circuit 200, including a logic circuit 100 or QAdder circuit 100, an additional M-bit adder 20, and a negative normalize circuit 30, this logic circuit 200 also serving as an additional basic logic block, box, or element, for different types of integer division circuits, as further shown below. The RQAdder circuit 200 is a modified cross-sum circuit that does calculate additionally to the raw quotient of the QAdder circuit 100 the cross-sum term that is normalized to a proper remainder value in the range $0 \ldots 2^M-2$. The input value of this circuit is the ones' complement or bit-wise inverted value of the dividend that is extended with an additional most significant digit. If the RIN input is set to all bits zero and the carry-in is set to unity, then that normalized output is the proper remainder of the division by $2^M-1$. If the RIN is set to the proper remainder of the division and carry-in is set to unity, then that normalized output results in all bits set to zero. If that normalized output does not result in all bits zero then the given RIN input is not the proper remainder of the division by $2^M-1$.

The additional M-bit adder 20 that is operatively connected to outputs of the logic circuit 100 includes an M-bit wide output, two M-bit wide inputs, and a carry-in bit. Moreover, one input of the two M-bit wide inputs of M-bit adder 20 is operatively connected to an output of the M-bit adder 10.N of logic circuit 100 or QAdder 100 of the most significant digit of the output word Q, the other input of the M-bit wide input of the additional M-bit adder 20 is the additional most significant digit of the input word CP, the carry-out bit of the M-bit adder 10.N of logic circuit 100 representing the most-significant digit of the input word CP is operatively connected to the carry-in bit of the additional M-bit adder 20. In addition, the M-bit wide output of the additional M-bit adder 20 being a raw remainder RR.

The raw remainder RR becomes normalized by the negative normalizing circuit 30 to result in a remainder R. The negative normalize circuit 30 inverts the RR value if not all RR bits are zero, otherwise, R equals to RR. The CP input to the RQAdder 200 is the ones' complement of the dividend that is extended to an additional most significant digit. If the dividend is only positive values, the value is unsigned extended, which means that the value is extended by the required number of bits each having value zero. If the dividend can assume positive and negative values, the value is signed extended, which means the value is extended by the required number of bits each having the value of the most significant bit of the not yet extended dividend value.

Figure 1C:
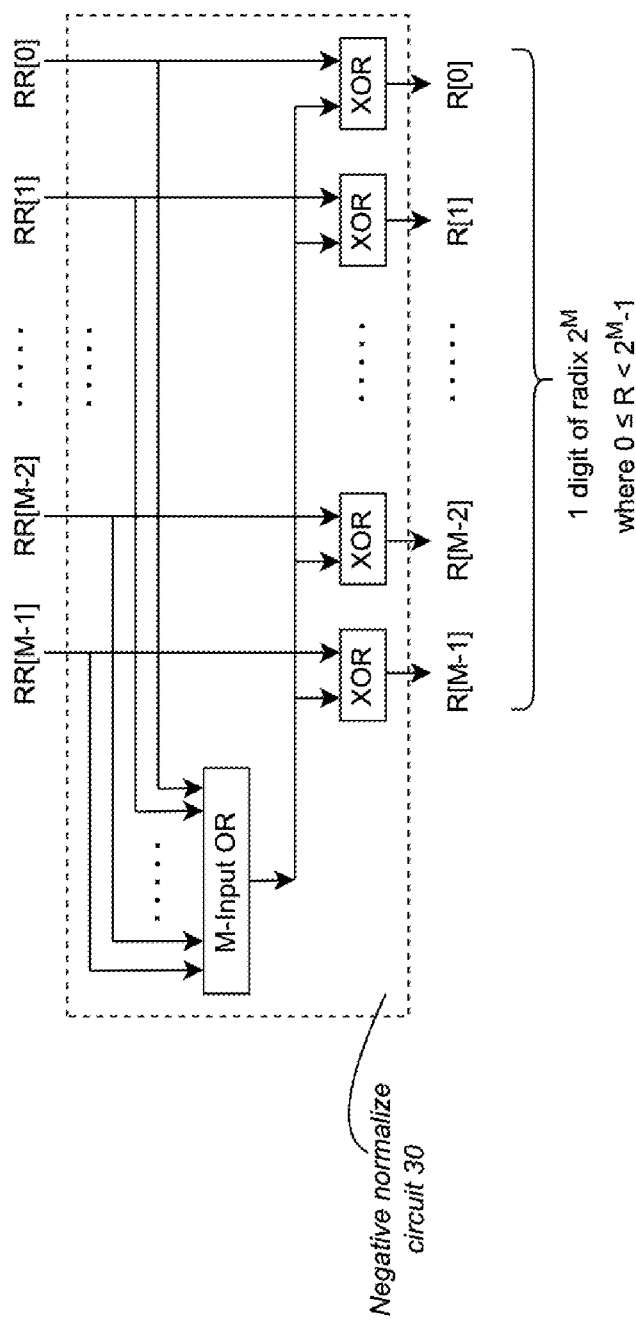
FIG. 1C shows an exemplary schematic view of a negative normalize circuit 30 using one OR and several XOR gates.
Figure 3:
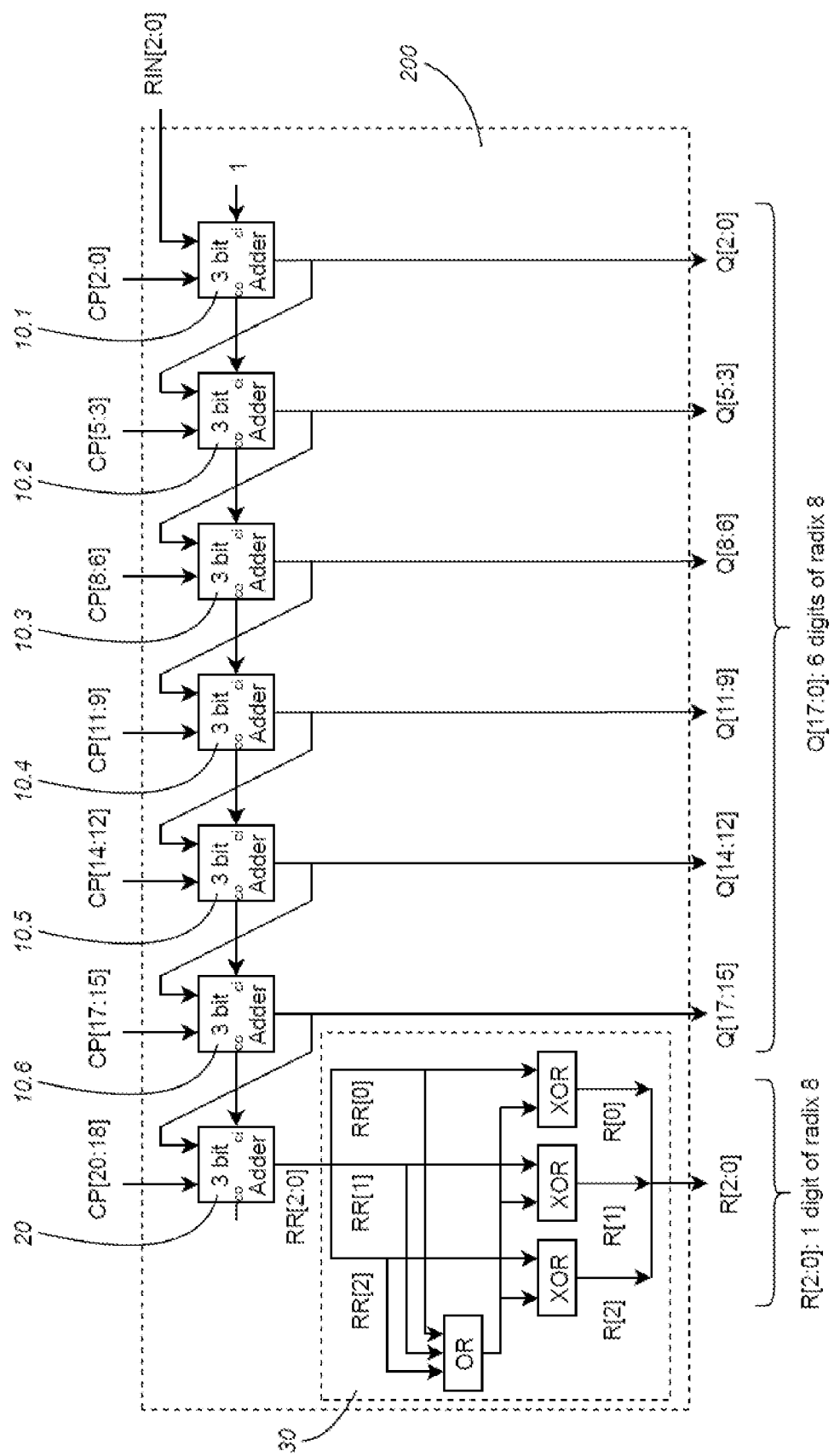
FIG. 3 shows an exemplary implementation of an RQAdder circuit 200 with six (6) 3-bit adders 10.1 to 10.6, and one additional adder 20, with an exemplary implementation of the negative normalize circuit 30 using one OR and several XOR gates.

In addition, a negative normalize circuit 30 shown in FIG. 1B, which is operatively connected to the output of the additional M-bit adder 20 is configured to determine whether the raw remainder RR is equal to zero or not, and if the raw remainder RR is zero, provide for a value R to be set to zero, and if the raw remainder RR is not zero, to provide for a value R that is a bit-wise inversion of the raw remainder RR. A general implementation of the negative normalize circuit 30 is also shown in FIG. 1C as an exemplary digital circuit, using one OR and several XOR gates, and a specific negative normalize circuit 30 is shown in FIG. 3, this figure showing an exemplary and non-limiting implementation with M=3, and can include an OR gate having M inputs and one output, the M-bit outputs of the additional M-bit adder 20 being operatively connected to the M inputs of the OR adder of negative normalize circuit 30, and a number M of XOR gates, each one of the XOR gates having two inputs, one input of the two inputs connected to the one output of the OR gate of negative normalize circuit 30, the other one of the two inputs connected to a respective bit of the M-bit wide output of the additional M-bit adder 20.

Figure 2A:
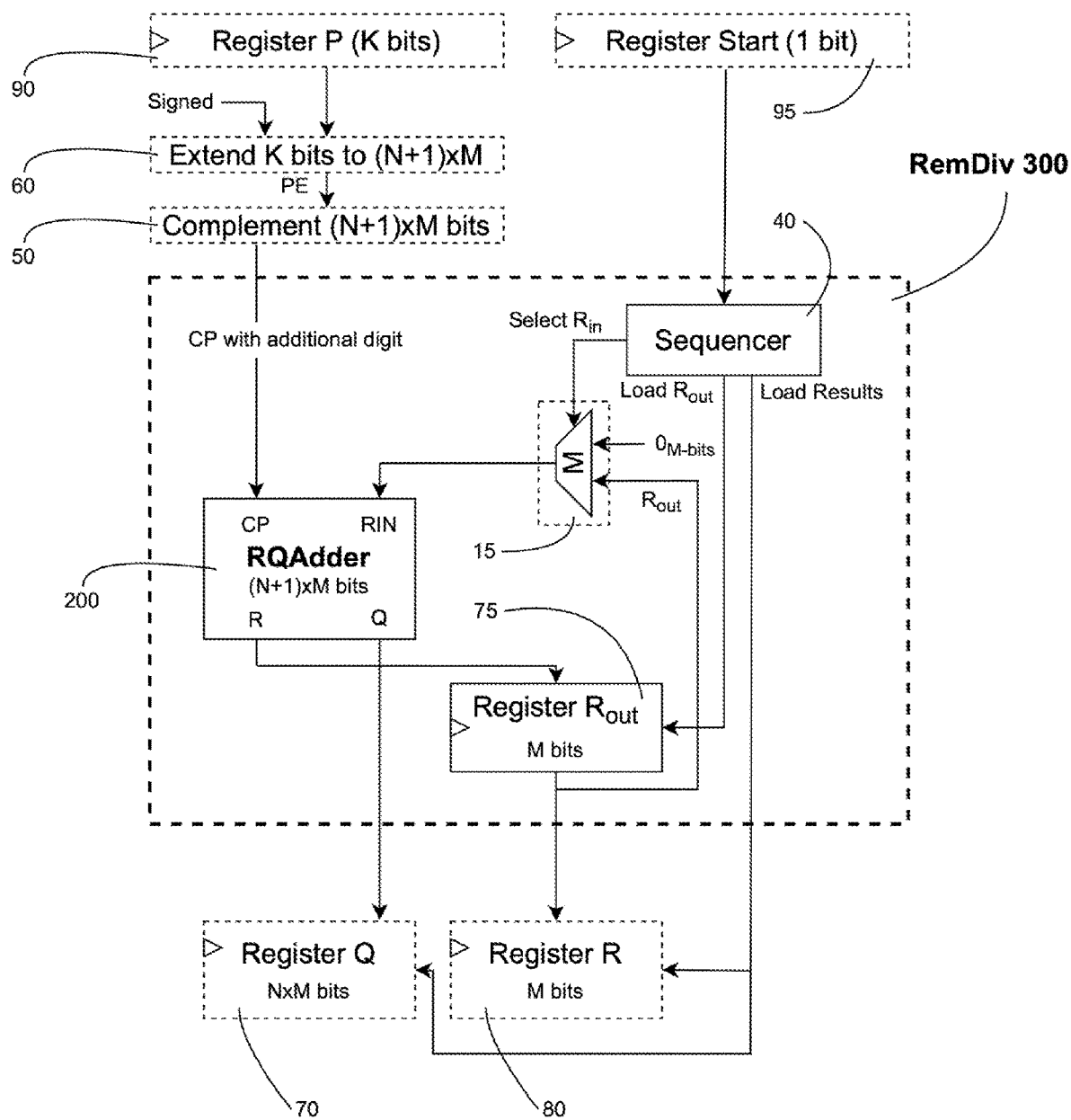
FIG. 2A shows an exemplary schematic view a divisor circuit 300, herein referred to as RemDiv circuit 300, including one RQAdder circuit 200 controlled by a sequencer state machine 40, a ones' complement circuit 50, and an extension circuit 60, according to yet another aspect of the present invention.
Figure 4:
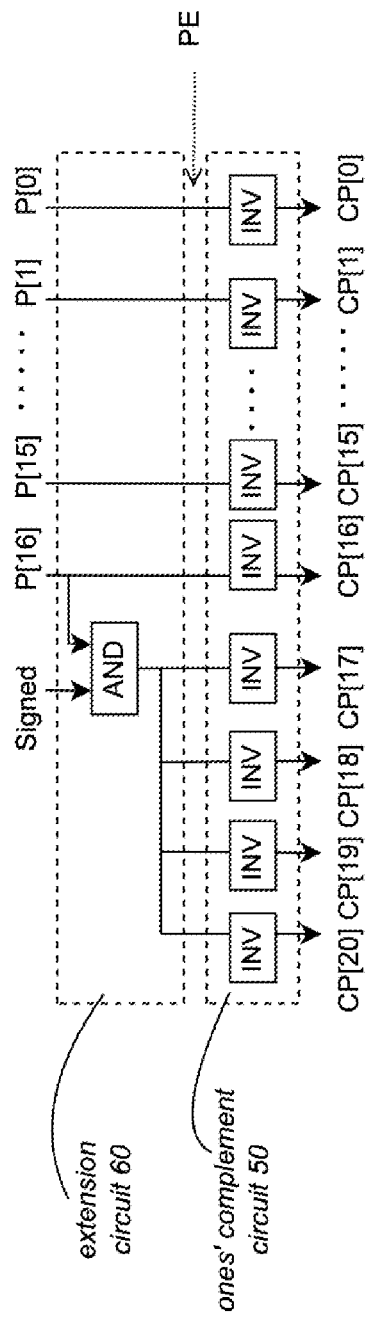
FIG. 4 shows an exemplary implementation of ones' complement circuit 50 and an extension circuit 60 of a given value for a word P and a number K=17 to be fed to an RQAdder circuit 200, for example the one shown in FIG. 3.

FIG. 2A shows an exemplary embodiment of a divider circuit 300 according to an aspect of the present invention, herein also referred to as the RemDiv circuit 300, where a RQAdder circuit 200 of FIG. 1B is shown as an element or building block of divisor circuit 300, also including an extension circuit 60 configured to zero- or sign-extend a word P of K bits, to obtain an extended word PE, for example from an input register 90 where the word P can be stored or provided, to a number of N+1 times M bits, where the word P is the original dividend of the division by a value $2^M-1$, and a ones' complement circuit 50 configured to bit-wise invert the extended word PE to obtain the input word CP that can be used by RQAdder circuit 200 as explained above, including the additional digit of the input word CP. An exemplary and non-limiting embodiment of the extension circuit 60 is shown in FIG. 4, and includes an AND gate having two inputs, one input obtaining the most significant bit of the word P from a register P having K bits, for example an input register 90, that can be but is not limited to a memory space, digital register, storage element, or other type of storage device for holding digital values, the other input being a signed or unsigned extension, thereby extending the word P to the extended word PE. Also, the ones' complement circuit 50 can be configured to bit-wise invert an extended word PE to obtain the input word CP, the original word P of register 90 having K bits. In this variant, a word P has the exemplary number of K=17. The ones' complement circuit 50 includes an inverter INV for each digit of the extended word PE. Outputs CP20-CP17 of extension circuit 60 are the signed or unsigned extension of the input value to the required number of output bits where the input signal or flag "Signed" controls the behavior of extension circuit 60. If "Signed" is zero, the behavior is unsigned extension, in other words the value is extended with all zero bits. If "Signed" is unity, the behavior is signed extension, in other words the value is extended with the most significant bit of the not extended value.

Moreover, divider circuit 300 also includes a sequencer state machine 40, a logic circuit or multiplexer circuit 15 for selectively applying the zero or the remainder value to the second input RIN of the RQAdder circuit 200, and different registers, for example an input register 90 for word P having K bits, a start register 95 having one bit, an output register for quotient Q having N times M bits, and an output register for remainder R with M bits. Moreover, output word R of RQAdder circuit 200 can be fed to a register $R_{out}$ 75 of M bits. Register $R_{out}$ 75 can be activated by an output signal Load $R_{out}$ of the sequencer state machine 40, and first and second output registers 70, 80 for Q and R can be activated by the output signal Load Results by the sequencer state machine 40, for transferring or loading the results of Q from the RQAdder circuit 200 to the register Q, and for transferring or loading the results of register $R_{out}$ to the register R. Also, sequencer state machine 40 is operatively connected to the logic circuit or multiplexer circuit 15 for selectively applying the zero or the remainder value $R_{out}$ to the second input RIN, by taking it from register 75, the logic circuit or multiplexer circuit 15 having an output signal Select $R_{in}$ for either selecting the application of the zero or the remainder value $R_{out}$ from the register $R_{out}$ to the second input RIN of the RQAdder circuit 200. In this embodiment, with a first operational state, sequencer state machine 40 makes sure that the remainder $R_{out}$ can be calculated by RQAdder circuit 200, and in a second operational state, the sequencer state machine 40 makes sure that the RQAdder circuit 200 calculates the quotient Q, so that only one circuit RQAdder circuit 200 can be used.

Figure 2B:
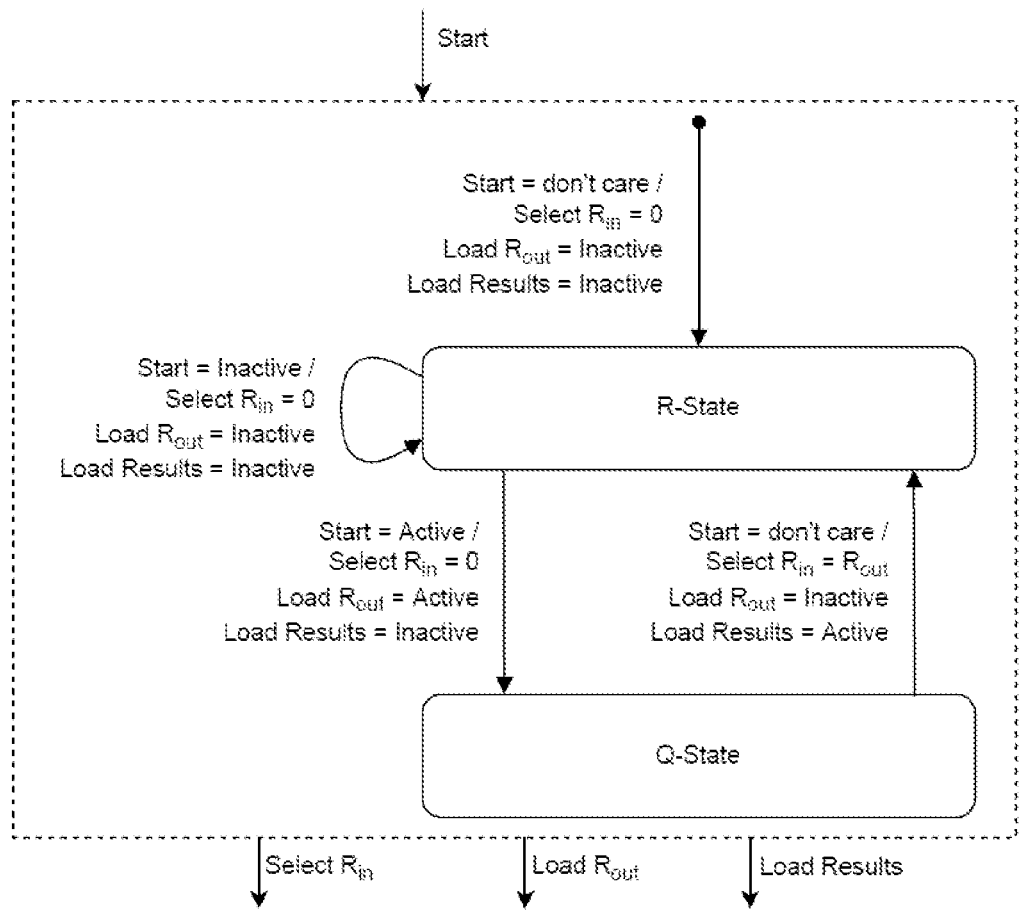
FIG. 2B shows a representative table representing the different states of the state machine provided by sequencer state machine 40 of FIG. 2A.

FIG. 2B shows an exemplary table with the different states that can be applied to the outputs of sequencer state machine 40, including the Select $R_{in}$, Load $R_{put}$, and Load Results, starting in the R-State as the initial state, for controlling the RQAdder for the two different operational states as explained above, and also shows a state diagram representing the states and the transitions as shown in the table.

With the first divider circuit 300 or RemDiv circuit 300 as shown in FIG. 2A, together with the sequencer state machine or circuit 40 having states as described in the table of FIG. 2B, it is possible to perform the division of the form $P=(2^M-1)$ Q+R, where Q and R is not known. In these figures, P is the positive or twos' complement negative dividend of K bits width, $(2^M-1)$ being the divisor with M being greater than 1, Q is the calculated quotient of N times M bits width with $$N = \left\lfloor \frac{K+M-1}{M} \right\rfloor,$$

R is the calculated remainder of M bits. From the N times M bits of the resulting quotient Q, only the lower NM−(M−1) bits contribute to the actual quotient value. The resulting Q has the same sign as the dividend P. The resulting remainder R is in the range $0 \leq R < (2^M-1)$. This circuit of FIG. 2A calculates in two adder steps the values for R and Q with one RQAdder circuit 200, controlled by the sequencer state machine or circuit 40. In the first adder step, the RQAdder circuit 200 calculates the remainder R from the (N+1) digits wide word CP and the M bit wide word $R_{in}$ that is set to zero through the M bit wide multiplexer circuit 15, selected by sequencer 40, and stores the resulting remainder in the M bit wide register $R_{out}$ 75. In the second adder step, the RQAdder circuit 200 calculates the quotient Q from the (N+1) digits wide word CP and the M bit wide RH, set to the register $R_{out}$ 75 value by sequencer 40 that control multiplexer circuit 15 to provide the word $R_{out}$ to the RIN of the RQAdder circuit 200. As discussed above, word $R_{out}$ was previously calculated in the first adder step. The sequencer circuit 40 only starts the first and second adder steps to calculate R and Q when the sequencer circuit 40 is triggered by the start register 95 while in the R-state. The register P 90 must hold its value until the results are stored in the register Q 70 and register R 80 respectively, until both first and second adder steps are performed. In essence, the circuit shown in FIG. 2A calculates the Q and R values by performing two RQAdder calculations with RQAdder circuit 200, controlled by sequencer 40.

Figure 2C:
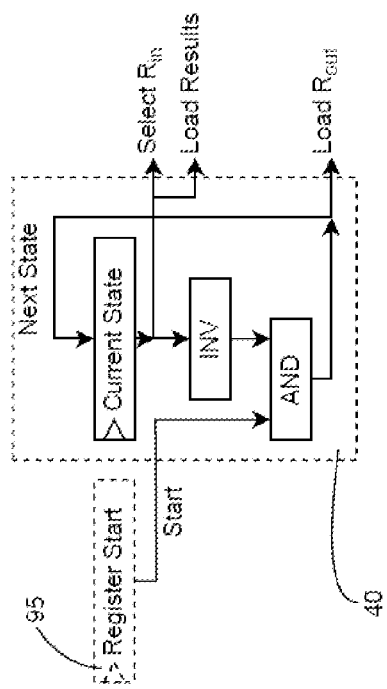
FIG. 2C shows an exemplary table having digital values for an implementation of the table showing the state of an exemplary state machine 40, and also shows an exemplary schematic of sequencer state machine 40.

FIG. 2C shows an exemplary table using exemplary digital values for a state machine, and a logic circuit as an example to implement the sequencer state machine 40, as a non-limiting implementation of the state machine of the table shown in FIG. 2B.

Figure 2D:
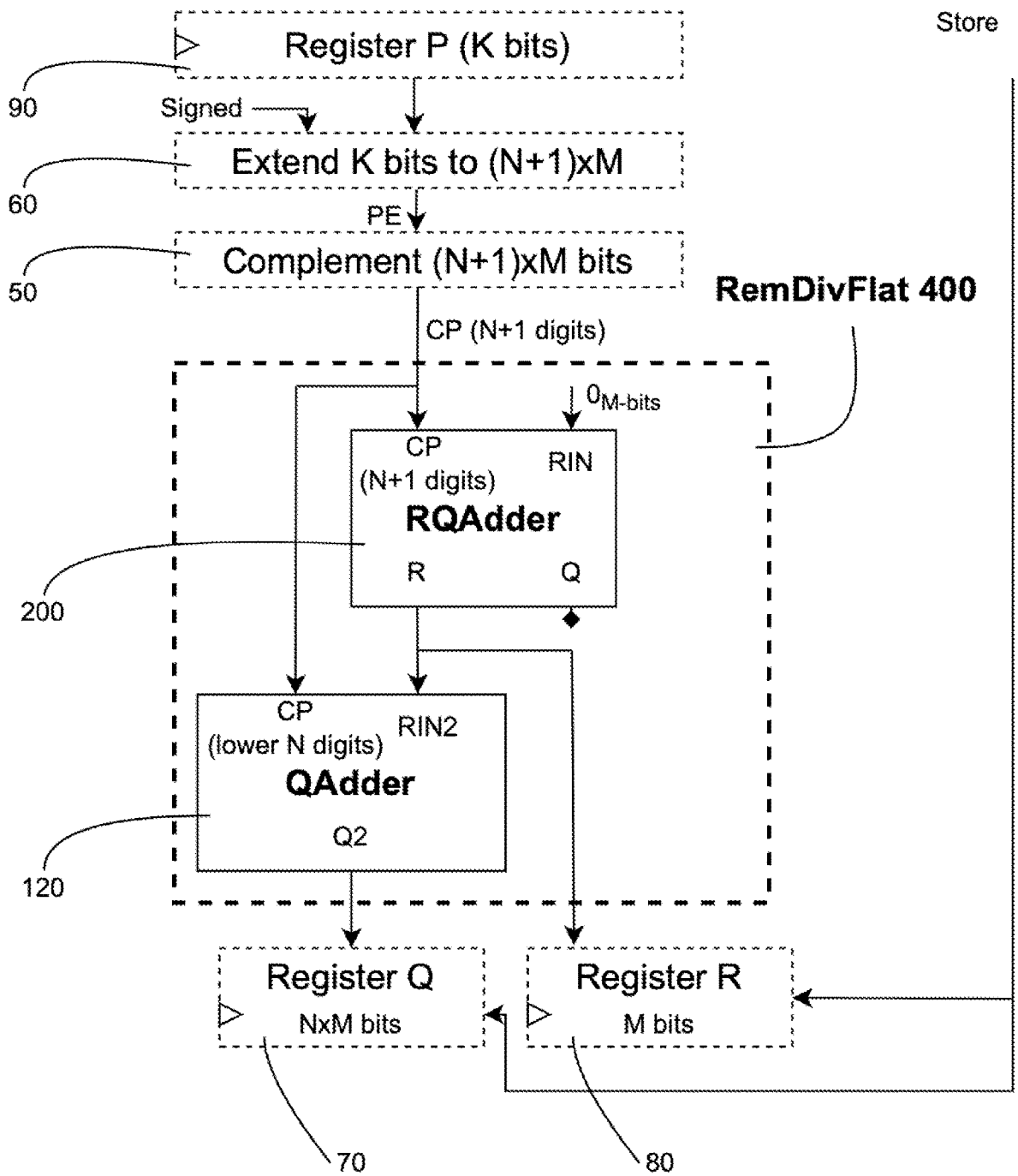
FIG. 2D shows an exemplary schematic view of another embodiment of a divisor circuit 400, herein referred to as RemDivFlat circuit 400, where the remainder R is calculated by an RQAdder circuit 200 and Q by a circuit QAdder 100 instances instead, also including a ones' complement circuit 50, and an extension circuit 60, according to still another aspect of the present invention.

FIG. 2D shows another embodiment of a divisor circuit 400, also referred to as RemDivFlat 400, including a both a QAdder circuit 120 and an RQAdder circuit 200, as shown above in FIGS. 1A and 1B, an extension circuit 60 configured to zero- or sign-extend the word P of K bits, for example a word from an input register 90, to a number of N+1 times M bits to provide for extended word PE that has an additional digit for the input word CP, a ones' complement circuit 50 configured to bit-wise invert the extended word PE to obtain the input word CP for the divisor circuit 400, including the additional digit of the input word CP. RQAdder circuit 200 provides for a remainder R that is provided to the input RIN2 of the QAdder 120, and the input word CP is fed to both the RQAdder circuit 200 and the QAdder circuit 120, but with the RQAdder circuit 200 receiving word CP with the additional digit to input word P that was provided by extension circuit 60. In turn the QAdder circuit 120 receives the word CP from ones' complement circuit 50 but without the additional digit. First output register 70 receives a quotient Q from the output word Q2 of QAdder circuit 120 having N times M bits, and second output register 80 receives remainder R from RQAdder circuit 200, having M bits. A control signal can be used to store the values of quotient Q and remainder R from the first and second output registers to another digital circuit, for example but not limited to for memory storage, further processing by a CPU. The QAdder circuit 120 can have the same architecture as the QAdder circuit 100, but as the RQAdder 200 also includes a QAdder circuit 100 as shown in FIG. 1B, a separate reference numeral is herein used for clarity.

The division circuit of FIG. 2D can be seen as an alternative embodiment for the divisor circuit 300 of FIG. 2A, and can be used for divisions of the form $P=(2^M-1) Q+R$, where Q and R are not known, where P is the positive or twos' complement negative dividend of K bits width, $(2^M-1)$ is the divisor with M being greater than 1, Q is the calculated quotient of N times M bits width with $$N = \left\lfloor \frac{K+M-1}{M} \right\rfloor,$$

R is the calculated remainder of M bits. From the N times M bits of the resulting quotient Q, only the lower NM−(M−1) bits contribute to the actual quotient value. The resulting Q has the same sign value as the dividend P. The resulting remainder R is in the range $0 \leq R < (2^M-1)$. Divisor circuit 400 first calculates the remainder R by employing RQAdder circuit 200 from (N+1) digits wide CP value and $R_{in}$ set to zero while the calculated quotient of the RQAdder circuit 200 is discarded. The QAdder circuit 120 then calculates the quotient Q from that calculated remainder R and the lower N digits of CP. The register P 90 must hold its value until the results are stored in the register Q 70 and register R 80, respectively. In essence, divisor circuit 400 calculates the Q and R values by performing one RQAdder circuit 200 and one QAdder circuit 120 calculation.

Figure 2E:
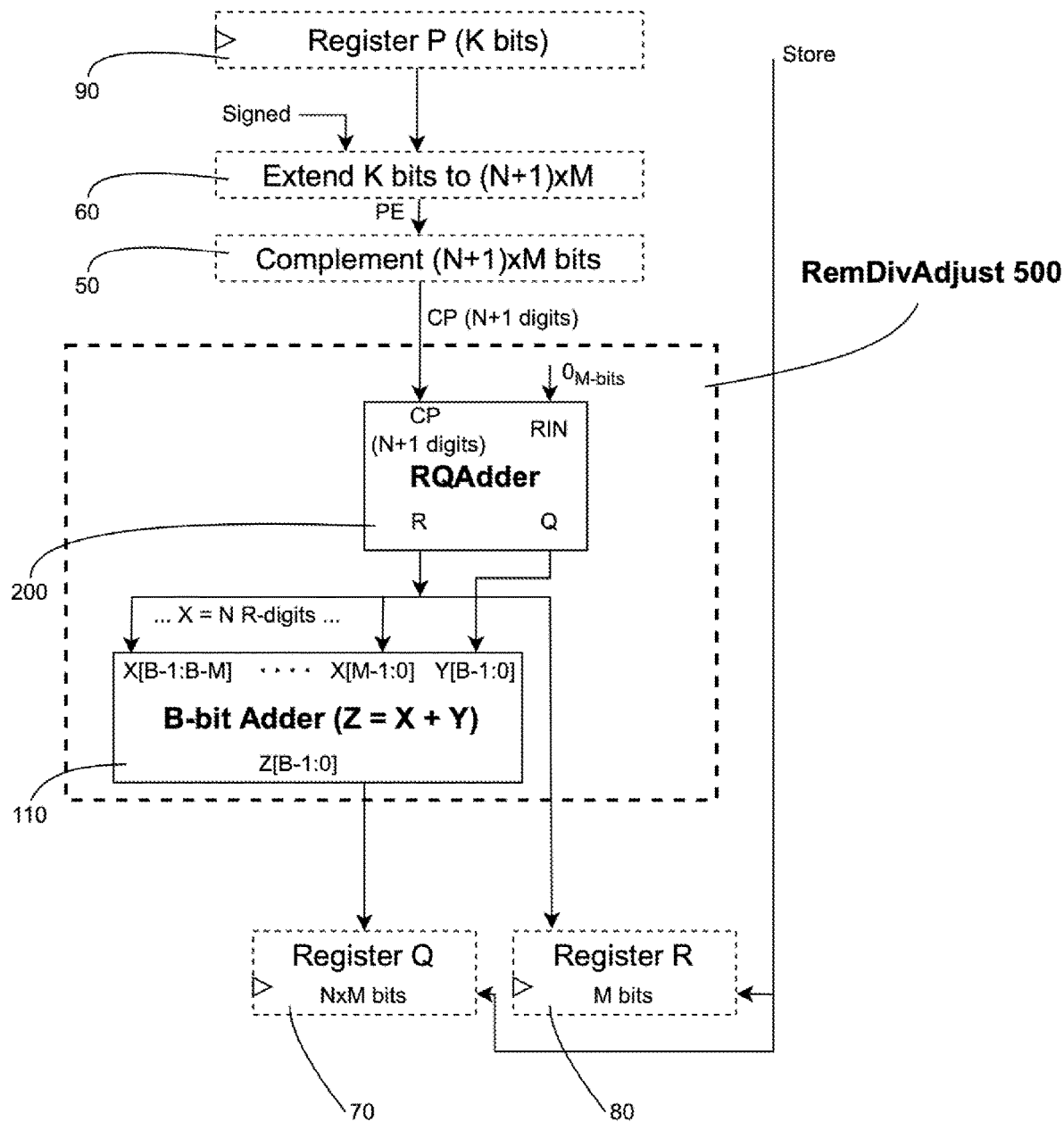
FIG. 2E shows an exemplary schematic view of another embodiment of a divisor circuit 500, herein also referred to as RemDivAdjust circuit 500, where the QAdder 100 of FIG. 2D is replaced by a B-bit Adder circuit 110 that adds to each digit of the Q output of the RQAdder circuit 200 the remainder digit of the RQAdder circuit 200 while respecting carries from one digit to the other, according to another aspect of the present invention.

FIG. 2E shows another embodiment for a divisor circuit 500, also referred to as RemDivAdjust 500, including an RQAdder circuit 200, an extension circuit 60 configured to zero- or sign-extend the word P of K bits, for example from an input register 90, to a number of N+1 times M bits to provide for the extended word PE with an additional digit for the input word CP, a ones' complement circuit 50 configured to bit-wise invert the extended word PE to obtain the input word CP for the RemDivFlat or divisor circuit 400, including the additional digit of the input word CP. Divisor circuit 500 can be an alternative embodiment for the divisor circuits of FIGS. 2A and 2D respectively.

Divisor circuit 500 also includes a B-bit third adder 110, and the B-bit third adder 110 includes a two B-bit wide inputs and a B-bit wide output word Z, B being N times M, one B-bit wide input of the two B-bit wide inputs operatively connected to the output word Q, and the other one B-bit wide input of the two B-bit wide inputs operatively connected to a concatenation of N times of the value R of the of the negative normalize circuit 30 of the RQAdder circuit 200. The first output register 70 is configured to receive an output word Z with N times M bits from the B-bit third adder 110, and the second output register 80 is configured to receive an output word R as the remainder R from the RQAdder circuit 200. A control signal can be used to store the values of quotient Q and remainder R from the first and second output registers to another digital circuit, for example but not limited to for memory storage, further processing by a CPU or other digital data processor.

The division circuit 500 can be used for divisions of the form $P=(2^M-1) Q+R$, where Q and R are not known, where P is the positive or twos' complement negative dividend of K bits width, $(2^M-1)$ is the divisor with M being greater than 1, Q is the calculated quotient of N times M bits width with $$N = \left\lfloor \frac{K+M-1}{M} \right\rfloor,$$

R is the calculated remainder of M bits, and B being N times M. From the N times M bits of the resulting quotient Q, only the lower NM−(M−1) bits contribute to the actual quotient value. The resulting Q has the same sign as the dividend P. The resulting remainder R is in the range $0 \leq R < (2^M-1)$. Divisor circuit 500 can calculate the quotient Q by employing an RQAdder circuit 200 under the assumption that the remainder is zero. If this assumption is wrong, each addition of a digit was off by the actual remainder R, which is simultaneously calculated. Adding that calculated remainder as digit to each digit of the provisionally calculated quotient Q leads to the actual quotient. This adding of the remainder to each digit of the provisionally calculated quotient is given by adder circuit 110. Adder circuit 110 includes a plain B-bit wide adder, unlike the chain of adders in the QAdder 100, 120 and the RQAdder 200. If the assumed remainder of zero was correct, the remainder digit that was calculated by the RQAdder circuit 200 is also zero, and thus, adding a zero digit to each digit of the provisionally calculated quotient does not alter that quotient, so that the provisionally calculated quotient in that case coincides with the actual quotient. Input register P 90 should hold its value until the results are stored as value Q in first output register 70 and as value R in second output register 80, respectively. In essence, divisor circuit 500 calculates the Q and R values by performing one RQAdder calculation with RQAdder circuit 200 and one B-bit addition with adder circuit 110.

Figure 2F:
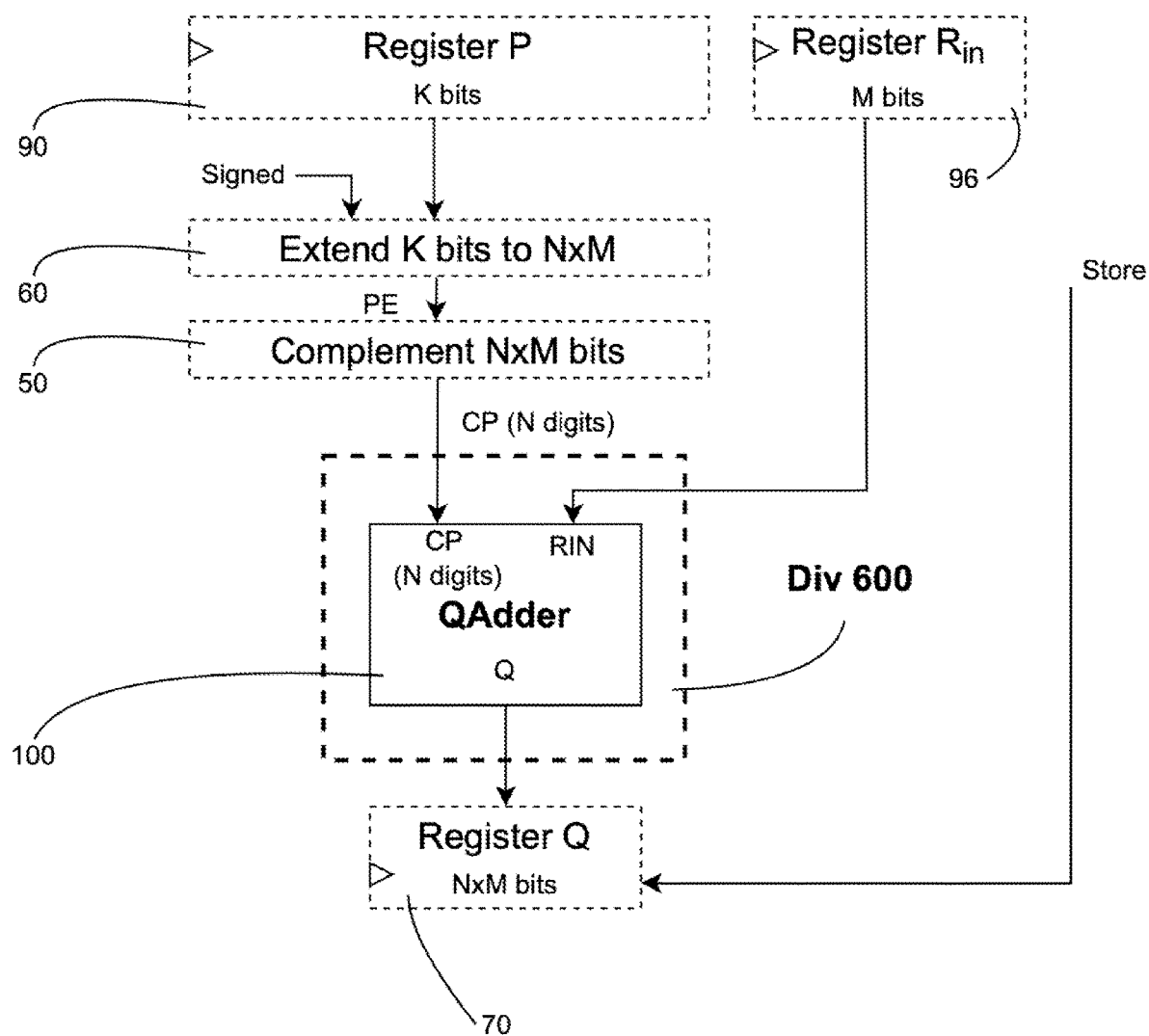
FIG. 2F shows an exemplary schematic view of a divisor circuit 600 or Div 600 for a case where the remainder $R_{in}$ is already known and can thereby be used with a QAdder circuit 100, remainder $R_{in}$ being provided to a register 96, according to another aspect of the present invention.

FIG. 2F shows another embodiment of a divisor circuit 600, also referred to as Div 600, including a QAdder 100 but without using the RQAdder circuit 200, an extension circuit 60 configured to zero- or sign-extend the word P of K bits, for example from an input register 90, to a number of N times M bits, to obtain an extended word PE, a ones' complement circuit 50 configured to bit-wise invert the extended word PE to obtain the input word CP for the divisor circuit or Div 600. This is a variant that can be used where the remainder R is already known, stored or otherwise provided to an input register $R_{in}$ 96. Output register 70 receives quotient Q from QAdder 100. Register P serves as an input register for word P having K bits.

Divisor circuit 600 can be used for divisions of the form $P=(2^M-1) Q+R_{in}$ where Q is not known and $R_{in}$ is known. P is the positive or twos' complement negative dividend of K bits width, $(2^M-1)$ is the divisor with M being greater than 1, $R_{in}$ is the M bit wide known remainder in the range $0 \leq R_{in} < (2^M-1)$, Q is the calculated quotient of N times M bits width with $$N = \left\lfloor \frac{K+M-1}{M} \right\rfloor.$$

From the N times M bits of the resulting quotient Q, only the lower NM−(M−1) bits contribute to the actual quotient value. The resulting Q has the same sign as the dividend P. Divisor circuit 600 can calculate the quotient Q only correctly by employing a QAdder circuit 100, if the given remainder $R_{in}$ is correct for the given division. The register P 90 and register $R_{in}$ 96 must hold their values until the result is stored in the register Q 70. In essence, divisor circuit 600 calculates the Q value by performing one QAdder calculation by using one QAdder circuit 100.

Figure 5:
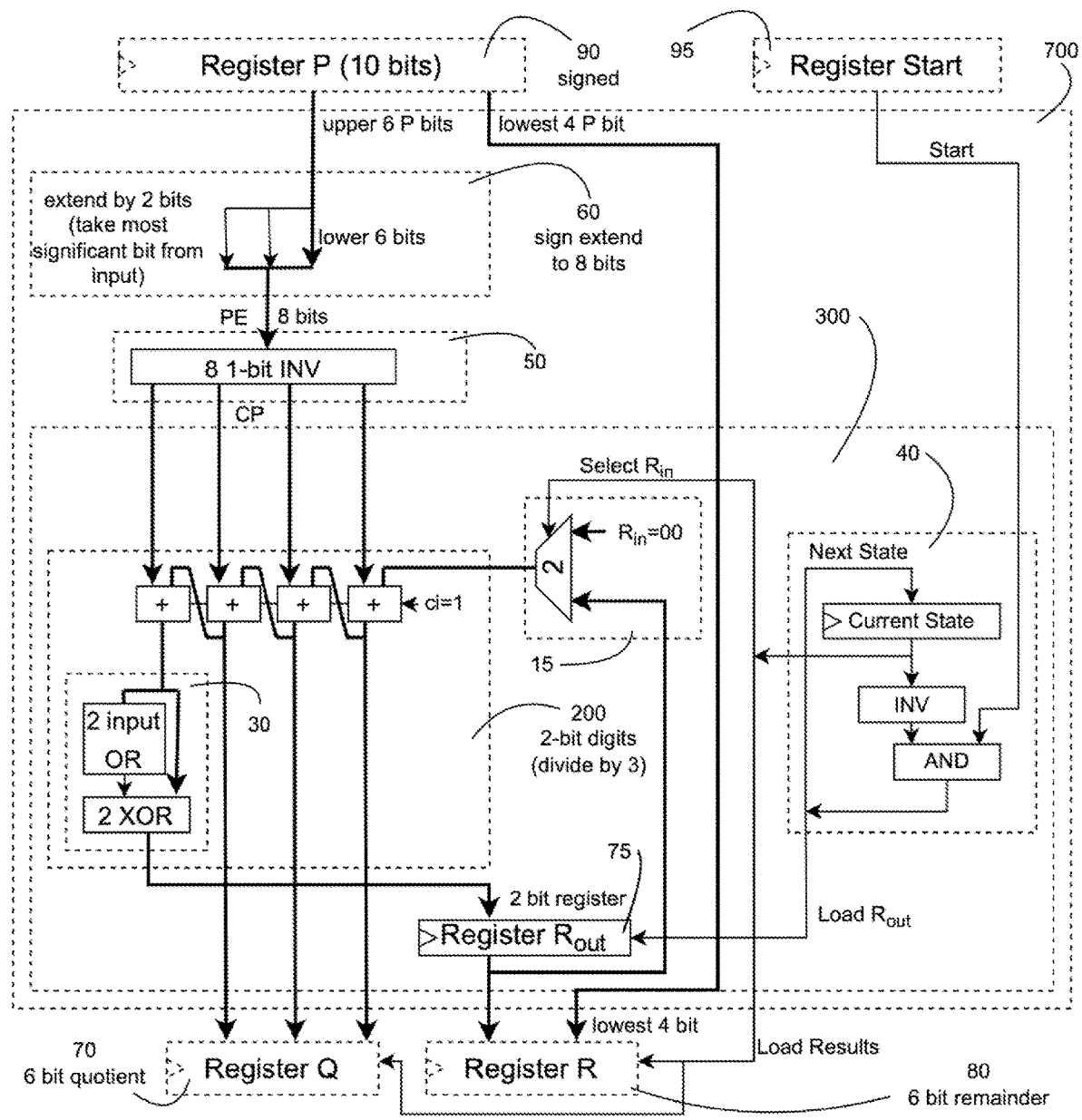
FIG. 5 shows an exemplary implementation of a divisor circuit 700 of a signed 10 bit dividend by the divisor $48=2^4$ $(2^2-1)$ by employing a RQAdder circuit 200 for division by $(2^2-1)$ together with a sequencer circuit 40, a multiplexer circuit 15, a register $R_{out}$ 75, a sign extension circuit 60, a ones' complement circuit 50, an input register P 90, an input register Start 95, an output register Q 70, and an output register R 80, according to another aspect of the present invention.

FIG. 3 shows an exemplary and non-limiting implementation of an RQAdder circuit 200 with six (6) 3-bit adders 10.1 to 10.6, with N equal to six (6) and M equal to three (3), and one additional adder 20, with an exemplary implementation of the negative normalize circuit 30 using one OR having three inputs from the output word RR from the negative normalize circuit 30, and three XOR gates, a number M equal to three (3) XOR gates, each one of the XOR gates having two inputs, one input of the two inputs connected to the one output of the OR gate, the other one of the two inputs connected to a respective bit of the M-bit wide output of the additional M-bit adder 20;

FIG. 4 shows an exemplary and non-limiting implementation of ones' complement circuit 50, and an extension circuit 60 of a given P value of K=17 bits generating an extended word PE and a word CP that can be fed to an RQAdder circuit 200 as the one shown in FIG. 3;

FIG. 5 shows an exemplary implementation of a divisor circuit 700, according to another embodiment of the present invention, configured to perform a division of a signed K=10 bit wide dividend by the divisor $48=2^T (2^M-1)$ for T=4 and M=2. The herein chosen numerical values for K, T, and M are used for exemplary and illustration purposes only, and shall not be limited to these values. The division operation is structured into an outer division by $2^T$ and an inner division by $(2^M-1)$, as further explained below. In this example, the outer division includes a routing the lower T=4 bits from the input register P 90 to the lower T=4 bits of the M+T=2+4=6 bits wide output register R 80. The inner division includes a division circuit 300 with an input word being the upper K−T=10−4=6 bits of register P 90 and the remainder from division circuit 300 being the upper M=2 bits of the M+T=2+4=6 bit wide register R 80. As an input value for the inner division, first, the signed extension circuit 60 is used from K−T=6 input bits to (N+1) M=(3+1) 2=8 bits for $$N = \left\lfloor \frac{K-T+M-1}{M} \right\rfloor = \left\lfloor \frac{10-4+2-1}{2} \right\rfloor = 3$$

to generate the extended word PE from word P of register 90, followed by the ones' complement circuit 50 that inverts word PE to generate the word CP, then word CP is provided to an RQAdder circuit 200 with N=3 and M=2 including the negative inversion circuit 30, controlled by the sequencer circuit 40 and the M=2 bit wide multiplexer 15 and the M=2 bit wide register $R_{out}$ 75. The N times M=6 bit wide register Q takes the quotient Q. From the 6 bits of the resulting quotient Q, only the lower NM−(M−1)=6−(2−1)=5 bits contribute to the actual quotient value. In essence, the divisor circuit 700 can perform a division $P=2^T (2^M-1) Q+R$ that is configured by parameters K, T, M and signed extension only, namely, the division $P=2^4 (2^2-1) Q+R$ is sequenced, for example for a K=10 bit wide signed input value P, into two (N+1)×M=8 bit wide RQAdder steps with RQAdder 200, resulting in a N×M=6 bit quotient and a M+T=6 bit remainder value.

Figure 6:
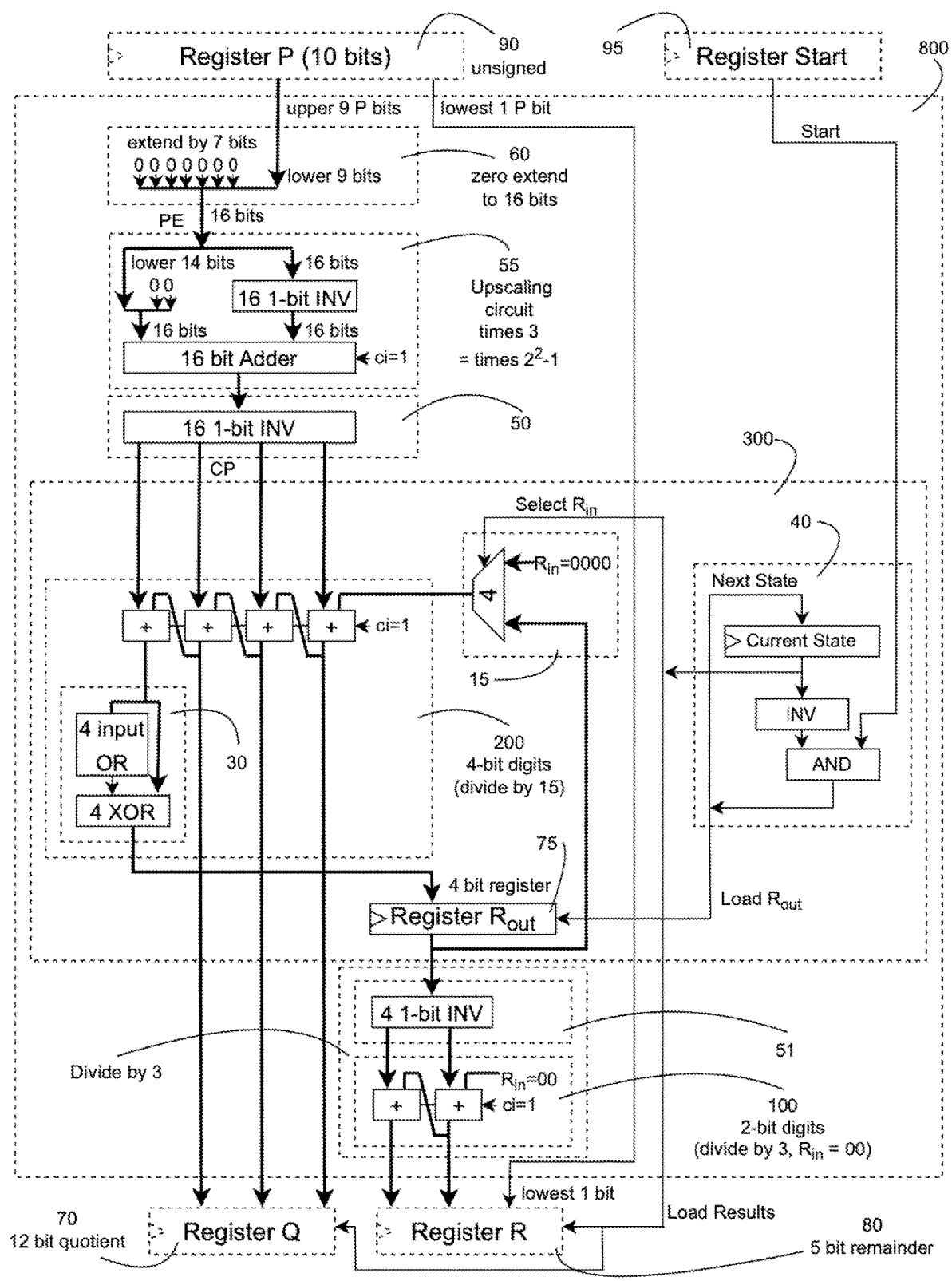
FIG. 6 shows an exemplary implementation of a divisor circuit 800 for an unsigned 10 bit dividend by the divisor $$10 = 2^1(2^2+1) = 2^1 \frac{(2^4-1)}{(2^2-1)}$$

FIG. 6 shows an exemplary implementation of a divisor circuit 800 configured to perform a division of an unsigned K=10 bit wide dividend by the divisor $10=2^T (2^M+1)$ for T=1 and M=2, according to another embodiment of the present invention. Again, the herein chosen numerical values for K, T, and M are used for exemplary and illustration purposes only, and shall not be limited to these values. The division can be structured into an outer division by $2^T$ and an inner division by $(2^M+1)$. The outer division includes routing the lower T=1 bits from the input register P 90 to the lower T=1 bits of the $2^M+T=4+1=5$ bits wide output register R 80. The inner division by $$(2^M + 1) = \frac{(2^{2M} - 1)}{(2^M - 1)}$$

can be performed by first scaling-up the input word PE by $(2^M-1)$ with upscaling circuit 55, then dividing that scaled-up value by $(2^{2}M-1)$ from upscaling circuit 55 with divisor circuit 300, inverting the resulting word $R_{out}$ from divisor circuit 300, for example $R_{out}$ in register 75, with ones' complement circuit 51, and finally scaling-down the provisionally calculated remainder by $(2^M-1)$ with QAdder 100. That 2M bit wide remainder of the inner division is stored in the upper $2^M$ bits of the register R 80. The quotient of the inner division is the actual quotient of the division and stored in register Q 70.

The input value to the inner division performed by circuit 300 needs proper extension with extension circuit 60 to the word PE before scaling-up and dividing by $(2^2M-1)$. The target width of the extension circuit 60 is by increasing the number of bits by M for the scaling-up by the factor (M−1) and based on that calculating the number N for 2M bit wide digits for the division by $(2^2M-1)$. The unsigned extension from K−T=10−1=9 bits to $(N+1) 2^M = (3+1) 4 = 16$ bits for $$N = \left\lfloor \frac{K-T+M+2M-1}{2M} \right\rfloor = \left\lfloor \frac{10-1+2+4-1}{4} \right\rfloor = 3$$

is performed by extension circuit 60. The following scaling-up by $(2^M-1)=3$ is performed by a 16 bit addition with carry in =1 and a ones' complement of the extended value and the 16 bit value produced by left-shifting the extended value by M=2 bits. Following the scaling-up by upscaling circuit 55 to generate a scaled-up word of PE, the ones' complement of the upscaled PE is produced and fed as CP value into the divisor circuit or RemDiv circuit 300, for example as shown in FIG. 2A. The Mersenne exponent for the RemDiv circuit 300 is 2M=4. The quotient Q of the divisor circuit or RemDiv circuit 300 is stored in the register Q 70 of width N times $2^M=3$ times 4=12 bits. The register $R_{out}$ 75 of RemDiv circuit 300 circuit includes the provisional 2M bits wide remainder provided by negative normalize circuit 30 after the first calculation step of RemDiv circuit 300. While performing the second step of RemDiv circuit 300, the actual remainder is calculated by a $2^M=4$ bit wide ones' complement with circuit 51 of the provisional remainder $R_{out}$, followed by the QAdder circuit 100 with 2 digits of M=2 bits each and $R_{in}=0$. From the 12 bits of the resulting quotient Q of register 70, only the lower N×2M−(2M−1) =3×4−(4−1)=9 bits contribute to the actual quotient value. From the (2M+T)=5 bits of the remainder register R 80, only the lower 1+M+T=1+2+1=4 bits contribute to the actual remainder value.

In essence, divisor circuit 800 can perform a division $P=2^T (2^M+1) Q+R$, and is configured by parameters K, T, M and unsigned extension flag, namely, the division $P=2^1 (2^2+1) Q+R$ is sequenced by sequencer state machine 40, for an exemplary K=10 bit wide unsigned input value P, into a (N+1)2M=16 bit wide adder step, followed by two (N+1) 2M=16 bit wide RQAdder steps using RemDiv 300 with Mersenne exponent 2M and, concurrent to the second RQAdder step, using a 2M=4 bit wide QAdder step with QAdder circuit 100 with Mersenne exponent M=2 and, resulting in a N×2M=12 bit quotient and a 2M+T=5 bit remainder value.

To recapitulate, the herein described logic circuits 100, 110, 120, 200, used as base elements or circuits, and also divisor circuits 300, 400, 500, 600, 700, 800, and the other circuits and elements described herein, have a multitude of applications where a scalable and performant digital circuit is required for performing different types of divisions, having fast latency and throughput time, as well as low power consumption, for example but not limited to for low-power high data throughput embedded processing, smart sensor implementations, Internet-of-Things (IoT) devices, data processors for artificial intelligence engines, for example neural trees, neural networks, decision trees, decision forests, and other types of artificial intelligence networks, data processors for normalization and scaling of data, dedicated data processors for parallel data processing, additions to existing CPU and ALU structures. For example, in the context of artificial intelligence computations, the herein presented circuits can be part of a Neural Accumulator (NAC) or a neural arithmetic logic units (NALU).

It is also possible that the herein presented logic circuits 100, 110, 120, 200 and divisor circuits 300, 400, 500, 600, 700, 800, or other circuits and elements described herein, are provided as descriptive data that is recorded on a non-transitory computer readable medium. For example, the descriptive data can include a schematic of the different logic circuits and divisor circuits, or can include a description of these circuits in hardware description language (HDL), for example VHDL or Verilog, or other types of hardware description concepts or languages. In this respect, the herein described logic circuits can be provided as library elements that are part of an electronic design automation (EDA) systems and software, for example as one or more library elements that can be used for designing circuits that can be implemented as application-specific integrated circuits, microprocessors, microchips, programmable logic devices, and other logic circuits. For example, the HDL description language can be provided to different types of compilers or synthesizers that operate on a digital data processor or hardware computer, the compilers configured to translate or transform the HDL description of the different circuits described herein to generate a data structure for a logic design implementation, for example a bit file for FPGA or CPLD programming, or different types of data structures for circuit design, for example gate level netlists, constraints data, timing and area requirements for creating a digital circuit into an integrated circuit (IC) or microchip.

It is also possible that the herein presented logic circuits 100, 110, 120, 200 and divisor circuits 300, 400, 500, 600, 700, 800, or other circuits and elements described herein, can be provided as software elements of a computer system or device. For example, a non-transitory computer readable medium can be provided, the non-transitory computer readable medium having computer code recorded thereon, the computer code configured to perform a method of performing a division when executed by a data processor device of a computer, the division using a modified cross-sum circuit or logic. Also, it is possible that a hardware computer device or hardware computer system is provided, having one or more logic circuits therein, the logic circuits configured to calculate a quotient based on a modified cross-sum of an input word.

The herein described embodiments of the different logic circuits 100, 110, 120 200 and divisor circuits 300, 400, 500, 600, 700, 800 or other circuits described herein, constitute a substantial non-abstract improvement of computer-related technology and also computer functionality itself, proposing a new hardware architecture that can be embodied in microchip technology, for example computer hardware that is configured to perform data processing, for instance providing for a strong improvement of central processing units (CPU) to provide for an additional circuit element or circuit element integrated to a CPU to perform certain types of divisions with a dedicated hardware circuit. In this respect, the herein presented digital circuits allow to substantially improve upon existing implementations of division circuits, for example binary division circuits that use a long series of subtraction and shift operations as the two basic operations to implement the division algorithm. Also, the herein presented embodiments of the different digital circuits can be used to complement or extend existing arithmetic logical units (ALU), and other types of computational hardware of a computer systems, for example for different types of application-specific or application-dedicated data processors, for example but not limited to graphics processing units (GPU), physics processing units (PPU), vision processing units (VPU), render output unit (ROP), texture mapping unit (TMU), neural arithmetic logic units (NALU), digital signal data processors and filters.

For example, the herein presented logic circuits 100, 110, 120, 200 and divisor circuits 300, 400, 500, 600, 700, 800, or other circuits described herein, allow to perform specific types of divisions by using an optimized and simplified logic architecture, thereby substantially reducing processing time, computation load or cost, and strongly improving computation speed, as compared to state of the hard hardware architectures, using a specific logic circuit having a defined architecture, for example as compared to the performance of a binary long division algorithm on a ALU of a CPU. In particular, the herein presented circuit also allow for an easy scalability of different types of divisions with a few parameters, thereby reducing the complexity of a customizable implementation for applications.

With respect to the divisions that can be performed by the different division circuits, some circuits of the state-of-the-art may only divide by specific constant values such as dividers of the form $2^T(2^M-1)$ and $2^T(2^M+1)$ respectively, for example but not limited to dividers 7, 10, 12, 15, 24, 30, and 60.

Generally speaking, an integer division can be rewritten as a product P=divisor D times quotient Q+remainder R, and can calculate for a given product P the quotient Q and the remainder R, for example for a divider D=$(2^M-1)$ for a given M, M being a positive integer number. Calculating the remainder R for such a divider D is done by calculating the iterative cross-sum and normalizing the resulting value from the range 0 . . . D to range 0 . . . D−1 by turning the cross-sum of value D to 0. See for example, R. D. Merrill, "Improving Digital Computer Performance Using Residue Number Theory," Electronic Computers, IEEE Transactions, Vol. EC-13, No. 2, pp. 93–101, April 1964. See also John Stillwell, "Elements of Number Theory," Chapter "Congruence Arithmetic," pp. 43–65, Springer Science & Business Media, New York, 2003. That cross-sum circuit needs an additional adder above the most significant digit of the input value to take the last carry out of the cross-sum into consideration. The needed input digit for that added can be considered as the input value zero-extended by one digit. This type of a cross-sum circuit is simply scalable to any size of input values by cascading adders per digit while simultaneously taking the carries of each addition into consideration for the subsequent digit adder.

Attempts for calculating the quotient Q were made by a device or circuit to calculate individual digits of quotient Q through elaborate cascades of adders which results in a non-scalable solution. Surprisingly, and according to an aspect of the present invention, a modified cross-sum circuit similar to the one described for calculating remainder R is suitable to calculate also the value of quotient Q, which leads also for quotient Q for a simply scalable circuit, as shown in FIG. 1A with QAdder circuit 100, or QAdder circuit 120, and RQAdder circuit 200 which includes QAdder circuit 100. The base of this modified cross-sum circuit is provided by transforming the given integer division P=$(2^M-1)$ Q+R into a not so obvious form Q=−P+$2^M$ Q+R. Q depends on itself in the way that resembles the cross-sum circuit, i.e. if viewed from a digit point of view, a digit of Q is the sum of the next lower digit of Q plus the digit of −P at that position, and the least significant digit of Q is the sum of the least significant digit of −P and the a-priori known R.

For twos' complement representation, −P is the sum of the ones' complement of P and unity. I.e. −P=~P+1, where the operator ~ represents the ones complement which is the bit-wise inversion of all the bits of P, as performed exemplarily by the ones' complement circuit 50. The quotient Q can now be described as Q=+2M Q+R+1. This is implemented by a modified cross-sum circuit, for example the herein described QAdder circuit 100, where the least significant digit of Q is an additional lowest valued adder to the original cross-sum circuit with one input being the least significant digit of ~P and the other input is the a-priori known R as an input, plus the carry input of that adder is set to unit to mimic −P by ~P+1.

The state of the art cross-sum circuits for calculating R takes a zero-extended value P as input, where the modified cross-sum for calculating the value Q, as the herein presented base circuit 100, namely QAdder circuits 100, 120, and RQAdder circuits 200 take as input the bit-wise inverted value of word P. These two application principles are conveniently combined into one RQAdder circuit 200 circuit to calculate both, R and Q, with that very same RQAdder circuit 200 circuit, only depending on the input value RIN. The combined circuit has the upper-most adder of the original cross-sum included again, an input of the upper-most adder is the inverted value of the extended digit of word P giving the extended word PE, the output of the upper-most adder is then fed into negative normalize circuit 30 for generating word R. That combined cross-sum circuit with the RQAdder circuit 200 takes the inverted value of the extended P and RIN as input, and produces for RIN=0 the value R in the sense of the original cross-sum, and produces for input value RIN=R, as just calculated here, the value Q.

While the invention has been disclosed with reference to certain preferred embodiments, numerous modifications, alterations, and changes to the described embodiments are possible without departing from the sphere and scope of the invention, as defined in the appended claims and their equivalents thereof. Accordingly, it is intended that the invention not be limited to the described embodiments, but that it have the full scope defined by the language of the following claims.

The invention claimed is:

1. A logic circuit configured to calculate a quotient based on a modified cross-sum of an input word CP, the input word CP being a result of a bit-wise inverted value and comprising a number N of M-bit digits having a radix $2^M$ from a least significant digit to a most significant digit, M and N being positive integer numbers larger than one, comprising:
   a number N of M-bit adders, each M-bit adder having an M-bit wide output, two M-bit wide inputs, a carry-in bit, and a carry-out bit,
   wherein a first input of the two M-bit wide inputs of each M-bit adder is operatively connected to an M-bit wide digit of the input word CP from the least significant digit to the most significant digit,
   wherein the M-bit wide output of each M-bit adder, other that the M-bit output of the M-bit adder representing the most significant digit of the input word CP, is operatively connected to a second input of the M-bit adder of a next higher valued digit of the input word CP,
   wherein the carry-out bit of each M-bit adder, other than the carry-out bit of the M-bit adder representing the most significant digit of the input word CP, is operatively connected to the carry-in bit of the M-bit adder of the next higher valued digit of the input word CP, wherein the carry-in bit of the M-bit adder representing the least significant digit of the input word CP is set to unity, wherein a second input RIN of the two M-bit wide inputs of the M-bit adder representing the least-significant digit of the input word CP is configured to be set to zero, or to receive a remainder value from another logic circuit, and wherein the number N of M-bit wide outputs of the M-bit adders provides for an output word Q having N digits, each digit of radix $2^M$, the output word Q being a raw quotient of the bit-wise inverted value of the input word CP.

2. The logic circuit of claim 1, further comprising:
a multiplexer circuit having an output operatively connected to the second input RIN, for selectively applying the zero or the remainder value to the second input RIN.

3. The logic circuit of claim 1, further comprising:
an additional M-bit adder having an M-bit wide output, two M-bit wide inputs, a carry-in bit,
wherein one input of the two M-bit wide inputs of the additional M-bit adder is operatively connected to an output of the M-bit adder of the most significant digit of the output word Q,
wherein the other input of the two M-bit wide inputs of the additional M-bit adder is operatively connected to an additional digit of the input word CP,
wherein the carry-out bit of the M-bit adder representing the most-significant digit of the input word CP is operatively connected to the carry-in bit of the additional M-bit adder, and
wherein the M-bit wide output of the additional M-bit adder being a raw remainder RR.

4. The logic circuit of claim 3, further comprising:
a negative normalize circuit configured to determine whether the raw remainder RR is equal to zero or not, and if the raw remainder RR is zero, provide for a value R to be set to zero, and if the raw remainder RR is not zero, to provide for a value R that is a bit-wise inversion of the raw remainder RR.

5. The logic circuit of claim 4, wherein the negative normalize circuit comprises:
an OR gate having M inputs and one output, the M-bit wide outputs of the additional M-bit adder being operatively connected to the M inputs of the OR gate,
a number M of XOR gates, each one of the XOR gates having two inputs, one input of the two inputs connected to the one output of the OR gate, the other one of the two inputs connected to a respective bit of the M-bit wide output of the additional M-bit adder.

6. The logic circuit of claim 1, further comprising:
an ones' complement circuit configured to bit-wise invert a word PE to obtain the input word CP, the word PE having K bits.

7. The logic circuit of claim 6, further comprising:
an extension circuit configured to zero-extend or sign-extend a word P to a number of N times M bits to obtain the word PE.

8. The logic circuit of claim 3, further comprising:
an extension circuit configured to zero-extend or sign-extend a word P to a number of N+1 times M bits to provide for the additional digit of the input word CP; and
an ones' complement circuit configured to bit-wise invert the word P to obtain the input word CP, the word P having K bits, including an inverted value of the additional digit of the input word CP.

9. The logic circuit of claim 4, further comprising
a number N of M-bit second adders, each M-bit second adder having an M-bit wide output, two M-bit wide inputs, a carry-in bit, and a carry-out bit, M and N being positive integer numbers larger than one,
wherein a first input of the two M-bit wide inputs of each M-bit second adder is operatively connected to an M-bit wide digit of the input word CP from the least significant digit to the most significant digit,
wherein the M-bit wide output of each M-bit second adder, other that the M-bit output of the M-bit second adder representing the most significant digit of the input word CP, is operatively connected to a second input of the M-bit second adder of the next higher valued digit of the input word CP,
wherein the carry-out bit of each M-bit second adder, other than the carry-out bit of the M-bit second adder representing the most significant digit of the input word CP, is operatively connected to the carry-in bit of the M-bit second adder of the next higher valued digit of the input word CP,
wherein the carry-in bit of the M-bit second adder representing the least significant digit of the input word CP is set to unity, and
wherein a second input RIN2 of the two M-bit wide inputs of the M-bit second adder representing the least-significant digit of the input word CP is operatively connected to the value R of the negative normalize circuit.

10. The logic circuit of claim 9, wherein the number N of M-bit wide outputs of the M-bit second adders provides for an output word Q2 having N digits, each digit of radix $2^M$, the output word Q2 being a quotient of the bit-wise inverted value of the input word CP.

11. The logic circuit of claim 10, further comprising:
a first output register having an input that is operatively connected to the number N of M-bit wide outputs of the M-bit second adders for storing the output word Q2 for further processing.

12. The logic circuit of claim 10, further comprising:
a second output register having an input that is operatively connected to the M-bit wide output of the M-bit adders for storing the value R for further processing.

13. The logic circuit of claim 4, further comprising:
a B-bit third adder, having two B-bit wide inputs and a B-bit wide output word Z, B being N times M,
wherein one B-bit wide input of the two B-bit wide inputs operatively connected to the output word Q, and
the other one B-bit wide input of the two B-bit wide inputs operatively connected to a concatenation of N times of the value R of the negative normalize circuit.

14. The logic circuit of claim 13, further comprising:
a first output register having an input that is operatively connected to the B-bit wide output word Z of the B-bit third adder for storing the B-bit wide output word Z for further processing.

15. The logic circuit of claim 13, further comprising:
a second output register having an input that is operatively connected to the M-bit wide output of the M-bit adders for storing the value R for further processing.

16. A logic circuit configured to calculate a quotient Q based on a modified cross-sum of an input word CP, the logic circuit comprising:
a digital circuit having a first input for the input word CP that is a bit-wise inverted value and comprising a number N of M-bit digits having a radix $2^M$ from a least significant digit to a most significant digit, the digital circuit configured to calculate the quotient Q, M and N being positive integer numbers larger than one, the digital circuit including a series of digital adder circuits that are cascaded for each digit, wherein the digital circuit has a second input RIN that is configured to be set to zero, or to receive a remainder value from another logic circuit, and wherein the digital circuit provides for an output word Q having N digits, each digit of radix $2^M$, the output word Q being a raw quotient of the bit-wise inverted value of the input word CP.

17. The logic circuit of claim 16, further comprising:
an ones' complement circuit configured to bit-wise invert an extended word PE to obtain the input word CP.

18. The logic circuit of claim 16, further comprising:
a logic circuit having an output operatively connected to the second input RIN, for selectively applying the zero or the remainder value to the second input RIN.

19. A non-transitory computer readable medium having hardware description language (HDL) code recorded thereon, the HDL code describing a logic circuit,
the logic circuit configured to calculate a quotient based on a modified cross-sum of an input word CP, the input word CP being a result of a bit-wise inverted value and comprising a number N of M-bit digits having a radix $2^M$ from a least significant digit to a most significant digit, M and N being positive integer numbers larger than one, comprising:
a number N of M-bit adders, each M-bit adder having an M-bit wide output, two M-bit wide inputs, a carry-in bit, and a carry-out bit,
wherein a first input of the two M-bit wide inputs of each M-bit adder is operatively connected to an M-bit wide digit of the input word CP from the least significant digit to the most significant digit,
wherein the M-bit wide output of each M-bit adder, other that the M-bit output of the M-bit adder representing the most significant digit of the input word CP, is operatively connected to a second input of the M-bit adder of a next higher valued digit of the input word CP,
wherein the carry-out bit of each M-bit adder, other than the carry-out bit of the M-bit adder representing the most significant digit of the input word CP, is operatively connected to the carry-in bit of the M-bit adder of the next higher valued digit of the input word CP,
wherein the carry-in bit of the M-bit adder representing the least significant digit of the input word CP is set to unity,
wherein a second input RIN of the two M-bit wide inputs of the M-bit adder representing the least-significant digit of the input word CP is configured to be set to zero, or to receive a remainder value from another logic circuit, and
wherein the number N of M-bit wide outputs of the M-bit adders provides for an output word Q having N digits, each digit of radix $2^M$, the output word Q being a raw quotient of the bit-wise inverted value of the input word CP.

20. The non-transitory computer readable medium of claim 19, wherein the HDL code further describes:
an ones' complement circuit configured to bit-wise invert an extended word PE to obtain the input word CP, and
an extension circuit configured to zero-extend or sign-extend a word P to a number of N times M bits to obtain the extended word PE.

* * * * *